United States Patent
Kotzur et al.

(10) Patent No.: US 9,891,050 B2
(45) Date of Patent: Feb. 13, 2018

(54) MEASURING DEVICE HAVING A FUNCTION FOR CALIBRATING A DISPLAY IMAGE POSITION OF AN ELECTRONIC RETICLE

(71) Applicant: LEICA GEOSYSTEMS AG, Heerbrugg (CH)

(72) Inventors: Norbert Kotzur, Altstätten (CH); Hans-Martin Zogg, Uttwil (CH); Stefan Martin Benjamin Gächter Toya, St. Gallen (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 266 days.

(21) Appl. No.: 14/782,274

(22) PCT Filed: Apr. 2, 2014

(86) PCT No.: PCT/EP2014/056591
§ 371 (c)(1),
(2) Date: Oct. 2, 2015

(87) PCT Pub. No.: WO2014/161882
PCT Pub. Date: Oct. 9, 2014

(65) Prior Publication Data
US 2016/0025491 A1 Jan. 28, 2016

(30) Foreign Application Priority Data
Apr. 5, 2013 (EP) ..................................... 13162640

(51) Int. Cl.
*G01C 15/00* (2006.01)
*G01C 25/00* (2006.01)

(52) U.S. Cl.
CPC ........... *G01C 15/002* (2013.01); *G01C 15/00* (2013.01); *G01C 25/00* (2013.01)

(58) Field of Classification Search
None
See application file for complete search history.

(56) References Cited

U.S. PATENT DOCUMENTS

| 5,886,340 A | 3/1999 | Suzuki et al. |
| 6,072,642 A | 6/2000 | Shirai |

(Continued)

FOREIGN PATENT DOCUMENTS

| CN | 1533497 A | 9/2004 |
| CN | 1761855 A | 4/2006 |
| CN | 1305582 C | 3/2007 |

(Continued)

OTHER PUBLICATIONS

European Search Report dated Aug. 14, 2013 as received in Application No. 13 16 2640.

*Primary Examiner* — Sath V Perungavoor
*Assistant Examiner* — Janese Duley
(74) *Attorney, Agent, or Firm* — Maschoff Brennan

(57) ABSTRACT

Some embodiments of the invention relate to a measuring device, in particular a video theodolite or video tachymeter. The measuring device may include a base, a support, a telescope optics having a lens, a physical target marking, an eyepiece, and a camera. The measuring device may also include an evaluation and control unit containing stored calibration parameters with respect to an image position indicating the target direction as target image position in the captured image, and a display for displaying a captured image having marking for the target image position. In some embodiments, a function may be included to respect and/or restore. In some embodiments, the function may be in form of an application on the user-device interface that can be called up.

20 Claims, 14 Drawing Sheets

(56) References Cited

U.S. PATENT DOCUMENTS

| | | | |
|---|---|---|---|
| 6,433,858 B1 | 8/2002 | Suzuki | |
| 6,504,602 B1 | 1/2003 | Hinderling | |
| 6,557,783 B1 | 5/2003 | Foster et al. | |
| 7,030,969 B2 | 4/2006 | Giger | |
| 7,623,224 B2 | 11/2009 | Vogel | |
| 7,633,610 B2 | 12/2009 | Walser | |
| 7,672,049 B2 | 3/2010 | Fruhmann et al. | |
| 7,982,866 B2* | 7/2011 | Vogel | G01C 1/04 356/139.01 |
| 9,658,335 B2* | 5/2017 | Siercks | G01S 17/89 |
| 2010/0145649 A1* | 6/2010 | Walsh | G01C 25/00 702/94 |
| 2011/0023578 A1* | 2/2011 | Grasser | G01C 15/00 73/1.75 |
| 2013/0093882 A1 | 4/2013 | Kotzur et al. | |
| 2014/0009604 A1* | 1/2014 | Hinderling | G01C 15/002 348/142 |

FOREIGN PATENT DOCUMENTS

| | | |
|---|---|---|
| DE | 197 10 722 A1 | 10/1997 |
| DE | 199 26 706 A1 | 12/1999 |
| DE | 199 49 580 A1 | 4/2000 |
| EP | 1 081 459 A1 | 3/2001 |
| EP | 1 662 278 A1 | 5/2006 |
| EP | 1 686 350 A1 | 8/2006 |
| EP | 1 695 030 B1 | 6/2009 |
| EP | 2 397 816 A1 | 12/2011 |
| EP | 2 405 236 B1 | 10/2012 |
| JP | 2001-004377 A | 1/2001 |
| KR | 10-1210519 B1 | 12/2012 |
| WO | 00/26713 A1 | 5/2000 |

\* cited by examiner

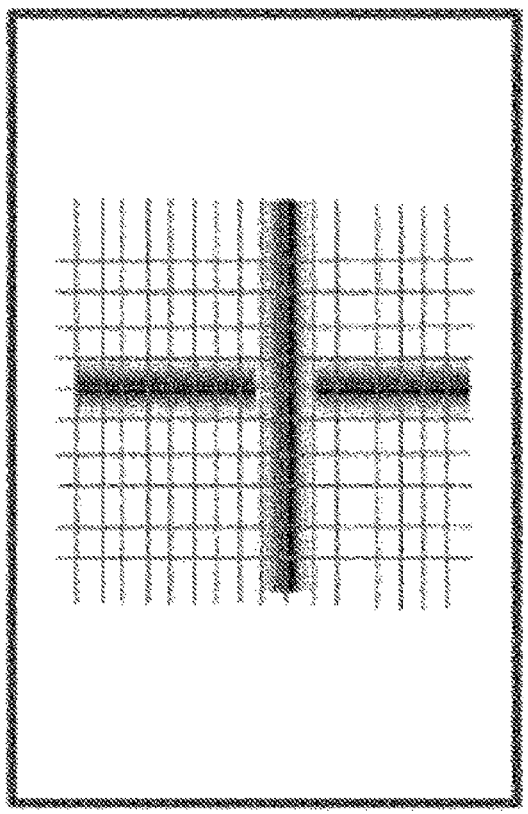
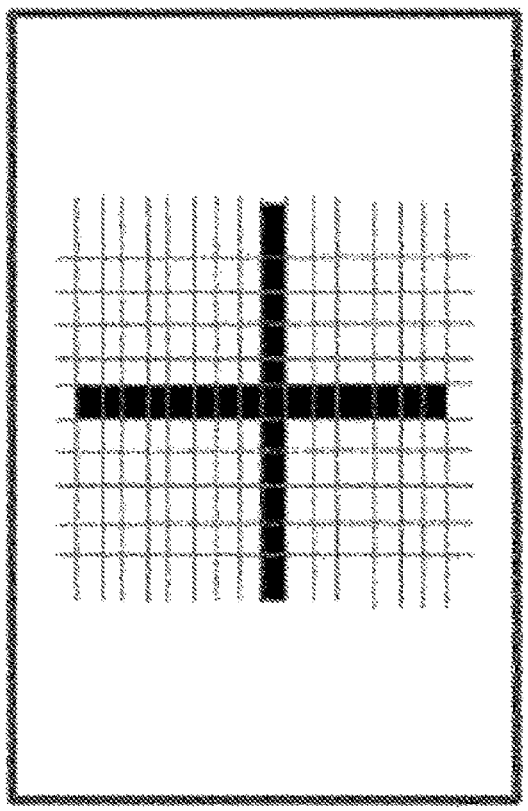
Fig. 13

MEASURING DEVICE HAVING A FUNCTION FOR CALIBRATING A DISPLAY IMAGE POSITION OF AN ELECTRONIC RETICLE

FIELD OF THE INVENTION

The invention relates to a surveying device having a coaxial camera integrated in the targeting unit, in particular a video theodolite or video tachymeter, a method for such a surveying device, and a computer program product.

BACKGROUND

A variety of geodetic methods and geodetic devices have been known since antiquity for surveying a target point. In this case, the distance and angle from a measuring device to the target point to be surveyed are recorded as spatial standard data, and in particular the location of the measuring device is captured, in addition to possibly provided reference points.

A theodolite, a tachymeter, or a total station, which is also referred to as an electronic tachymeter or computer tachymeter, represents a generally known example of such surveying devices or geodetic devices. Such a geodetic measuring device of the prior art is described, for example, in published application EP 1 686 350. Such devices have electro-sensory angle measuring functions and possibly distance measuring functions, which permit a determination of direction and distance to a selected target. The angle or distance variables are ascertained in the internal reference system of the device in this case and must possibly still be linked to an external reference system for absolute position determination.

Modern total stations have microprocessors for the digital processing and storage of captured measurement data. The devices generally have a compact and integrated construction, wherein usually coaxial distance measuring elements and also computer, control, and storage units are provided in one device. Depending on the expansion stage of the total station, means are integrated for motorization of the target optics, for reflector-free distance measurement, for automatic target search and tracking, and for remote control of the entire device. Total stations known from the prior art furthermore have a wireless data interface for establishing a wireless connection to external peripheral components, for example, to a data capture device, which can be designed in particular as a handheld data logger, field computer, notebook, small computer, or PDA. By means of the data interface, it is possible to output measurement data, which are captured and stored by the total station, for external further processing, to input externally captured measurement data into the total station for storage and/or further processing, to input or output remote control signals for remote control of the total station or a further external component, in particular in mobile field usage, and to transfer control software into the total station.

The measurement precision achievable during the surveying operation varies depending on the embodiment of the target point to be surveyed. If the target point is represented, for example, by a target reflector—such as a 360° prism—designed especially for surveying, substantially more precise measurement results can thus be achieved than in the case of a reflector free measurement, for example, to a point of a house wall to be surveyed. This is because, inter alia, the emitted optical measurement beam has a planar beam cross-section rather than a punctiform beam cross section and therefore not only measurement radiation scattered on the actual target point to be surveyed is received, but rather also measurement radiation scattered from points in the immediate field of vision vicinity of the target point, to which the measurement radiation is also applied. For example, the roughness of the surface of the point to be surveyed influences the precision of reflector-free measurements in a known manner.

For aiming at or targeting a target point to be surveyed, surveying devices of the type in question have a targeting unit (such as a telescope). In a simple embodiment variant, the targeting unit is designed, for example, as a telescopic sight. Modern devices can additionally have a camera, which is integrated into the telescopic sight, for capturing an image, wherein the captured image can be displayed in particular as a live image on a display screen of the total station and/or a display screen of the peripheral device—such as a data logger—used for the remote control. The optics of the targeting unit can comprise a manual focus in this case—for example, a set screw for changing the focal position of the optics—or can have an autofocus, wherein the focal position is changed, for example, by servomotors. Automatic focusing units for telescopic sights of geodetic devices are known, for example, from DE 197 107 22, DE 199 267 06, or DE 199 495 80.

The optical system or the optical viewing channel of the targeting unit contains in particular an objective lens group, a focusing lens group, and an ocular, which are arranged in this sequence from the object side. The position of the focusing lens group is set in dependence on the object distance so that a sharp object image results on an optical element, which is arranged in the focal plane, having targeting marking (in particular reticle or graticule, or plate having crosshair marking and hash markings). This optical element having the image created in this plane can be observed through the ocular.

The coaxial camera (for example, having CCD or CMOS surface sensor), which is provided in addition to the direct vision channel, can be arranged in a further image plane provided in the telescope optics, for which decoupling of a partial light beam via a beam splitter can be provided, so that an image (or a series of images or a video stream) can be recorded through the objective using the camera.

Furthermore, an additional separate transmitting and receiving channel branch can be provided for the coaxial electronic distance measurement. In addition, common surveying devices currently comprise an automatic target tracking function (ATR: "automatic target recognition"), for which a further separate ATR light source—for example, a multimode fiber output, which emits light having a further defined wavelength—and a special ATR camera sensor are additionally integrated in the telescope.

To prevent distortions, color faults, or vignetting—i.e., a brightness drop in the edge regions of an observable field of vision—enormously high demands are placed on the individual optical components. Accordingly, special and complexly coated optics are generally required for decoupling and coupling individual wavelengths, wherein in spite of the coating, the visual band is to enable display with the best possible color fidelity. In addition, the high complexity of the telescope requires a high level of expenditure for the required high-precision mounting and alignment of the optical components.

For example, the construction of telescopic sights of the type in question of geodetic devices is disclosed in published applications EP 1 081 459 or EP 1 662 278.

In the case of a typical one-man surveying task using target reflector, for example, a total station is set up in the terrain. The user moves a handheld surveying rod, which supports the target reflector, to a target point to be surveyed, wherein the position of the target reflector and therefore of the target point can subsequently be determined as follows. The control of the total station is performed in particular by remote control by the user carrying the surveying rod by means of a data logger, which has a wireless connection to the total station. The data logger can be attached in this case to the surveying rod equipped with the target reflector or can additionally be handheld by the user in addition to the surveying rod.

Aiming at a target can generally be performed in this case either using the physical crosshair provided in the telescope/ telescopic sight or by means of a live image, which is displayed to the user in the display screen of the base station (or the data logger), and an electronic crosshair overlaid thereon, which is provided by the camera arranged coaxially in the telescopic sight as a targeting unit of the total station. Accordingly, the user can appropriately align the total station on the desired target, which is recognizable in the live image, on the basis of the live image, for which an artificial (i.e., electronic) crosshair can be displayed superimposed in the displayed live image of the coaxial camera. The image position at which the electronic crosshair is to be displayed is to be selected as much as possible in this case so that the spatial direction thus indicated corresponds as accurately as possible to the direction which is indicated by the physical optical element, which is integrated in the telescope, having targeting marking (i.e., the reticle, for example). This is independently of whether the direction indicated by the reticle (targeting direction) itself also has an error in relation to the actual measurement direction (i.e., the direction in which finally the measurement radiation is emitted and therefore represents the measurement direction). This direction error between targeting direction and measurement direction is handled in this case independently of the problem of the positioning of the electronic crosshair in the image and is to be considered separately.

Since a physical recalibration (realignment) of the targeting direction indicated by the physical optical element having targeting marking, so that it corresponds to the measurement direction, can be complex and no differences are to exist in the case of targeting via looking through the telescope in comparison to targeting via observation of the display image having the artificial crosshair, in an ideal video total station, the artificial crosshair is to indicate as exactly as possible the same (targeting) direction as the physical targeting marking. To display the artificial crosshair as faithfully as possible at a corresponding point in the display screen image, a calibration (with determination of corresponding calibration parameters) is carried out at the factory after assembly of the surveying device. Such a factory calibration, as is known per se to a person skilled in the art in the field of surveying device construction, establishes a relationship between the measurement coordinate system of the surveying device and the camera coordinate system in consideration of the present surveying device geometry. Examples of such known factory calibrations are described, for example, in patent literature publications U.S. Pat. No. 7,982,866, U.S. Pat. No. 7,623,224, and EP 1 695 030, wherein, however, a procedure based on camera image recordings of known target marks, which is complex with respect to the required environment and the measurement conditions, is required. In this context, calibration parameters with respect to standing axis and tilt axis errors (direction errors) or a displacement of camera component parts can also be ascertained using such factory calibrations in a known manner.

However, such errors do not remain stable in the course of time. Thus, for example, they are influenced by physical shocks (for example, during transport), by temperature influences, or by other material properties, which vary in the course of time.

It is true that a field calibration, which can be carried out by the surveyor himself in the field, with respect to standing axis errors and tilt axis errors is often made in a known manner before performing a surveying task (for example, known as a two-location measurement or changeover measurement, in which an identical target is targeted successively once in a first location (face I) and once in a second, changed location of the telescope (face II) via the physical reticle and the angles are measured in each case). However, in addition, during later use of the display screen for targeting a target (i.e., the electronic crosshair), a deviation can result in the target coordinate determination in relation to targeting on the basis of the physical reticle.

SUMMARY

Some embodiments of the invention reduce or remedy this problem, namely that the calibration parameters stored during the factory calibration with respect to the image position at which the electronic crosshair is to be overlaid, become incorrect or inaccurate with respect to correspondence with the physical target marking and therefore errors can arise with time and/or under specific conditions (for example, after a shock).

The surveying device relating to the invention, in particular a video theodolite or a video tachymeter, comprises in this case at least one base, a support which is pivotable in relation thereto, a targeting unit which is pivotable in relation thereto, goniometers for measuring pivot positions of the support and the targeting unit, an analysis and control unit, and a display screen.

The targeting unit is equipped in this case with telescopic optics, which define an optical beam path, and comprises an objective, a physical targeting marking (in particular a reticle), which defines a targeting direction, an ocular, and a camera for recording an image through the objective.

The analysis and control unit contains in this case stored calibration parameters with respect to an image position, which indicates the targeting direction, in the recorded image as a targeting image position and the display screen is controlled accordingly in this case or is designed to display an image recorded using the camera together with a marking for the targeting image position as a targeting aid, in particular an electronic crosshair, which is displayed superimposed on the image or overlaid in the image such that its crosshair center point falls on the targeting image position.

In order to now check and/or reestablish consistency (which possibly no longer sufficiently exists after the influence) between the targeting direction indicated by the physical targeting marking and the direction indicated by the marking for the targeting image position after influencing the geometry between the physical targeting marking and the camera component part in the targeting unit, in the scope of the present invention, a function—in particular in the form of an application retrievable at the user device interface—is provided, on the basis of which this is enabled in a less complex and comparatively substantially automated manner or in a manner which guides the user.

For this purpose, in the scope of the function a special procedure or a special sequence of targeting actions—and calibration measurements performed in each of these targeting positions—is defined according to the invention, which is to be performed in the scope of the function.

Thus, in this case targeting actions of an identical target successively have to be performed at least once using the physical targeting marking and at least once using the marking for the targeting image position as a targeting aid. On the part of the device, items of sequence information are stored for this defined sequence in the analysis and control unit in this case.

After starting the function, the following actions are then performed automatically controlled or carried out by the analysis and control unit in response to a trigger (for example, for the purpose of naming and later simpler reference to be identified as the first trigger), which can be given upon targeting (actuated by a user, for example) of the target using the physical targeting marking, a control such that a first pivot position of the support and the targeting unit is automatically measured by the goniometers and/or a first image is recorded by the camera, and these are captured as first measurement data and added to a measurement data set, and in response to a trigger (for example, for the purpose of naming and later simpler reference to be identified as the second trigger), which can be given upon targeting (actuated by a user, for example) of the target using the marking for the targeting image position, a control such that—conforming in type with the first measurement data—a second pivot position of the support and the targeting unit is measured by the goniometers and/or a second image is recorded by the camera, and these are captured as the second measurement data and added to the measurement data set.

Furthermore, the targeting image position is then automatically checked with respect to consistency with the targeting direction defined by the physical targeting marking and/or recalibrated by updating the stored calibration parameters, in an automatic manner on the basis of a correlated analysis of the measurement data set.

The function provided on the part of the device with its defined sequence and the application stored for this purpose can be explained in greater detail as follows in a possible embodiment.

After starting the function, the first measurement position is to be assumed—in particular by the user—by the targeting unit (in particular wherein the user can be prompted to do this on the part of the device via a displayed indicator). The device thereupon enters a trigger waiting mode and receiving mode. Knowing which of the two targeting aids will be used by the user for targeting the target in the first measurement position, the first calibration measurement is then automatically carried out in this mode—in response to a user-given trigger. In this case—alternatively or additionally to the possibility of the specification on the part of the device, for example, by guiding and prompting of the user on the part of the device about which targeting aid is now to be used for the first targeting of the target—the user-given trigger signal or an addition to this signal can optionally also contain the information about which of the two targeting aids was used for targeting the target in this first measurement position by the user. After receiving the trigger, further components of the surveying device are then activated and the first measurement data are captured so that they comprise a first pivot position of the support and the targeting unit, which is measured by the goniometers, and/or a first image recorded by the camera. The captured first measurement data are subsequently automatically added to a measurement data set.

After completion of the capture of the first measurement data, for example, the user can then be prompted and guided by an indicator output on the part of the device to assume the second measurement position using the targeting unit, in which the targeting unit is to be aligned such that the identical target is targeted or collimated via the other targeting aid—with respect to that used for the first calibration measurement. The device thereupon automatically resumes the trigger expectation mode and receiving mode.

Again, for example, by defined specification of existing knowledge or by obtaining an item of information from the user about which of the two targeting aids is now to be used by the user for targeting the target in the scope of the second calibration measurement, the second calibration measurement is then carried out automatically in this mode—again in response to a user-given trigger. For this purpose, second measurement data are captured, which comprise a second pivot position of the support and the targeting unit, which is measured by the goniometers, and/or a second image recorded by the camera.

A sequence with respect to the targeting actions, i.e., whether firstly targeting is to be performed using the physical targeting marking and subsequently targeting is to be performed using the electronic marking, or the other way around, can be freely set in principle in this case, either, for example, by pre-definition and defined known specification or also by free selection on the part of the user. The designation of the trigger and the measurement data (etc.), which is used in the claims, as the first and second triggers and first and second measurement data (etc.) is to be understood in this case as solely for name assignment and simpler clear reference. It is only relevant in this case that—independently of a sequence of the targeting actions which is actually used—a corresponding item of information is finally provided on the part of the device via the respective targeting aid (i.e., electronic or physical) used for the application, which is associated with the measurement data captured in the respective calibration positions. This information—as mentioned above—can either be provided by pre-definition or specification on the part of the device (for example, in conjunction with corresponding instruction and guiding of the user as to which targeting aid is to be used to carry out the present targeting, for example, by output on the part of the device of a corresponding indicator, such as the display of an item of graphic or written information in this regard on the display screen) or also—for the case in which it can be freely selected by the user—by input of a corresponding item of information by the user (for example, by pressing a specific button on the device, which can optionally function simultaneously as the trigger allocation).

In particular, multiple passes (i.e., repetitions) of such targeting actions—performed applying both targeting aids—and calibration measurements can also be carried out (which the user can be requested to do or for which the possibility can optionally be provided to the user, for example, to enable a user to also carry out a check and/or recalibration—which is performed with a comparatively higher degree of definition—if needed). For this purpose, the sequence can then be defined so that multiple passes of the targeting actions are carried out. In the scope of the function, in a manner automatically controlled by the analysis and control unit, further measurement data comprising a further pivot position of the support and the targeting unit, which is measured by the goniometers, and/or a further image recorded by the camera can be captured automatically and added to the measurement data set in each case in response to a further trigger, which can be given upon targeting of the target performed by a user while using the physical target marking or while using the marking for the targeting image position as a targeting aid.

In the case of a sequence thus defined having multiple passes of the targeting actions, furthermore, in the scope of the function, the correlated analysis of the measurement data set, which is carried out automatically by the analysis and control unit, can then be carried out as an intermediate analysis after carrying out one defined pass of the multiple passes of the targeting actions, in particular after each of the passes, and a degree of determination and/or degree of quality with respect to a redetermination of the targeting image position can be ascertained for the measurement data collected up to the respective intermediate analysis. The analysis and control unit can then derive, for example, on the basis of this degree of determination, an item of information as to whether further passes of targeting actions are to be carried out or whether the function is to be ended, in particular wherein this information is output as an action recommendation to the user by means of provided output means, in particular visually (graphically or in writing) by the display screen.

Furthermore, in a special exemplary embodiment, the sequence can be defined so that the targeting actions are repeated in a changed state of the targeting unit (i.e., that the targeting actions, in addition to the performance in a first location of the targeting unit [face I] are also performed in a second location of the targeting unit [face II]—changed in relation to the first). In the scope of the function, in a manner automatically controlled by the analysis and control unit in response to a further trigger (for example, to be referred to as the third trigger for the purpose of name assignment), which can be given by a user with targeting of the target performed in the changed state of the targeting unit (for example, face II), while using the physical targeting marking, third measurement data comprising a third pivot position, which is measured by the goniometer, of the support and the targeting unit and/or a third image recorded by the camera can be automatically captured and added to the measurement data set, in response to a further trigger (for example, to be referred to as the fourth trigger for the purpose of name assignment), which can be given by a user with targeting of the target performed in the changed state of the targeting unit (for example, face II), while using the marking for the target image position as the targeting aid, fourth measurement data, which conform in type to the third measurement data, comprising a fourth pivot position, which is measured by the goniometer, of the support and the targeting unit and/or a fourth image recorded by the camera can be automatically captured and added to the measurement data set.

To enable the correlated analysis in this case, it is relevant, in the scope of a pass of targeting actions and calibration measurements, to capture types of data comparable to one another in this case (i.e., both times a pivot position or both times an image or both times both pivot position and also image) and add them to the measurement data set. If such passes are carried out repeatedly, it is only relevant that overall measurement data comparable to one another are finally collected in the measurement data set. In particular, however, it can then also be necessary that an item of information is again provided or is associated or can be derived, about which targeting aid was used in each case during the capture of the respective measurement data in this case (and for the case that if in this case different targets were targeted and/or targeting was performed both in the normal location (face I) and also in the changed location (face II) of the targeting unit in the various passes in this case, about which target and if necessary in which location the respective measurement data of the measurement data set were captured during which passage while using which targeting aid).

Depending on which data type (angle positions or image data) or whether optionally both data types were finally collected in this case in the scope of the measurement data set as the respective first, second, and optional further measurement data, these data are also to be further processed accordingly during the correlated analysis.

For example, if the first and second measurement data comprise at least one first and one second pivot position in this case, a difference between the first and the second pivot positions can thus be ascertained in the scope of the function during the correlated analysis of the measurement data set. This difference can then—while using stored parameters with respect to the camera geometry and the optical projection properties thereof—be used for the checking and/or the recalibration.

In particular, this difference—using the stored parameters with respect to the camera geometry and the optical projection properties of the camera—can be translated into an image position offset, by which the targeting image position deviates from a new setpoint targeting image position. The image position offset thus obtained can then be applied to the targeting image position for the recalibration, so that the stored calibration parameters are updated such that they reflect the new setpoint targeting image position as the targeting image position.

For example, if the first and second measurement data comprise at least one first and one second image in this case, in the scope of the function during the correlated analysis of the measurement data set, on the basis of image recognition and while using the second image (in which information can be read directly about which object is used and aimed at as the target), an identification of the target can be performed in the first image and an image position of the identified target in the first image can be determined as the target image position. A deviation of the target image position from the targeting image position can therefore be derived therefrom and this deviation can be used for the checking and/or the recalibration.

In particular, for example, on the basis of this deviation, the targeting image position can be checked directly (wherein a tolerance range for such a deviation is predefined and it is checked whether the deviation lies within the tolerance range, for example). In addition, the targeting image position can also be recalibrated directly on the basis of this deviation by updating the stored calibration parameters, in particular wherein the stored calibration parameters are updated such that the updated calibration parameters then newly reflect the ascertained target image position as the targeting image position.

If the measurement data set has a redundancy in this case—with respect to a derivation of information about a correspondence of the electronic (digital) targeting marking with the physical targeting marking (for example, by repeatedly carrying out the targeting actions and calibration measurements and/or by capturing measurement data of both types in the scope of a pass of the targeting actions), thus the respective measurement data which are comparable to one another—with respect to type and optionally with respect to the target aimed at or the location of the targeting unit which was used (face I or face II)—measurement data comparable to one another can be analyzed in correlation with one another in pairs (for example as intermediate analyses), so that then, for example, in the scope of an overall analysis, it is possible to average over accumulated intermediate analyses.

Thus, if the measurement data set contains redundant measurement data with respect to the checking and/or recalibration of the targeting position, such a redundancy can thus be used automatically in the scope of the function by the analysis and control unit for averaging, so that the accuracy can be increased for the checking or recalibration, and/or an ascertainment of a degree of determination or degree of quality of the checking or recalibration. Alternatively or additionally, however, such a redundancy can also be used for a concurrent check or recalibration (i.e., having a chronological relationship on the part of the procedure with the checking or recalibration of the targeting image position) of at least one of the following further calibration parameters:

- a parameter with respect to a direction error as a deviation of the targeting direction defined by the physical targeting marking from an actual measurement axis [also called tilting axis error and standing axis error],
- a parameter with respect to an error of the goniometers,
- a parameter with respect to a camera geometry of the camera,
- a parameter with respect to a projection property of the camera, or
- a parameter with respect to an error of the optical axis of the camera.

In one special embodiment of the invention—as already briefly mentioned at various points—output means can be provided for outputting indicators, in particular wherein the display screen can display the output means for the visual (graphic or written) output. The output means can then be automatically activated in the scope of the function, for example, by the analysis and control unit, such that a user is guided through the sequence of targeting actions on the basis of the output indicators, in particular wherein

- an indicator is displayed to prompt the user to respectively perform one of the targeting actions either using the physical targeting marking or using the marking for the targeting image position as a targeting aid, in particular wherein it is indicated in each case whether the respective targeting action is to be carried out in the changed state of the targeting unit or not,
- an indicator is displayed as a statement of whether a respective automatic capture of measurement data in response to a respective trigger has been successfully completed,
- after completion of a respective automatic capture of measurement data in response to a respective trigger, an indicator is displayed as a statement, that and which next targeting action is to be carried out in the scope of the defined sequence, and/or
- after completion of a respective automatic capture of measurement data in response to a respective trigger, an indicator is displayed as a statement that all targeting actions of the sequence are completed, in particular with supplementary statement about whether the measurement data set, which was collected on the basis of the performed targeting actions, makes the image position able to be checked sufficiently profoundly or makes the image position able to be updated with sufficient accuracy and determination.

If the surveying device has a temperature sensor in this case, the stored calibration parameters can additionally contain a temperature-dependent function for the targeting image position, so that the marking which can be displayed on the display screen for the targeting image position can be set in accordance with a present temperature such that the different geometry present in each case at different temperatures between the physical targeting marking and the display component part in the telescope is considered for setting the targeting image position (so that it corresponds in each case to the physical targeting marking). In the scope of the function, a temperature can then be captured in an automatically controlled manner by way of the analysis and control unit by the temperature sensor and this temperature can also be taken into consideration by the analysis and control unit for the checking or recalibration.

A camera pixel resolution is defined in this case for the camera in dependence on the number of pixels of the camera surface sensor used (which can be a CCD or a CMOS sensor in a known manner), whereby the recordable image has a defined image pixel resolution.

Nonetheless, in the scope of the function, the targeting image position can be checked with sub-image pixel resolution if necessary and/or recalibrated by updating the stored calibration parameters automatically by the analysis and control unit.

Furthermore, a specific display pixel resolution is also defined for the display screen—depending on the display screen used—which is generally less than the camera pixel resolution in the case of such surveying devices.

This enables, inter alia, a display of the camera image in digital zoom steps, without this necessarily being accompanied by an image display quality worsening, or interpolation absolutely being required immediately for this purpose.

In particular because of the often comparatively low display screen resolution, in a refinement of the invention, the marking for the targeting image position can advantageously now be displayed in a grayscale and/or color level display such that the image position is indicated with sub-display screen pixel resolution as seen by the user.

For the capture of image measurement data in the scope of the calibration measurements and the overlay of the electronic marking in the image, in this case a corresponding presently applied digital zoom factor and image display detail is to be taken into consideration if necessary in each case.

The image as described above throughout here, which can be captured by the coaxial camera, advantageously represents a live image of the camera for the targeting—as is routine in devices of this type and in the prior art—i.e., an image series recorded by the camera practically in real time, which can be displayed on the display screen practically in real time.

Furthermore, a coaxial laser distance meter can be integrated in the targeting unit, as is also well known in the prior art for geodetic surveying devices (such as for a video tachymeter or a video total station).

In addition, the surveying device can comprise at least one base station (often considered to be the actual surveying device in this form), which comprises at least the base, the support, the targeting unit, and the goniometer—and also in particular the analysis and control unit and the display screen. However, the surveying device can also comprise, in particular in addition to the base station, a peripheral remote control unit, which has a data connection to the base station and is physically independent, wherein the display screen and the analysis and control unit are provided either in the peripheral remote control unit or in the base station or—usable as needed—in the peripheral remote control unit and the base station.

Furthermore, the function provided according to the invention can also run completely automatically on the side of the device, as is explained as an example hereafter.

As is known in the prior art, the surveying device can also comprise an automatic targeting function and optionally an automatic target tracking function (ATR: "automatic target recognition"), for which a further separate ATR light source—for example, a multimode fiber output, which emits light having a defined wavelength—and a special ATR camera sensor are additionally integrated in the telescope, so that with at least rough targeting of a retroreflective target, the ATR light is retroreflected and therefore a light reflection spot is generated on the ATR camera sensor, which can be analyzed with respect to its position of incidence and thus high-precision automatic targeting or tracking can be caused via automatic motorized alignment changes of the targeting unit. In the event of targeting via the calibrated ATR function, the measurement axis of the surveying device can thus be aligned automatically on a retroreflective target.

If the surveying device has such an ATR function and furthermore a direction error of the targeting direction indicated by the physical targeting marking in relation to the measurement axis is known, automatic high-precision targeting of a retroreflective target can then also be performed on the basis of the ATR function in the scope of the function according to the invention. The measurement data which can be captured in the case of such automatic targeting can then—of course in consideration of the known direction error—be added to the measurement data set as representative of measurement data stored targeting using the physical targeting marking.

In addition—as described, for example, in patent literature publications EP 2 405 236 or EP 2 397 816—completely automatic targeting of the target can also be performed, which can be used similarly or as a replacement for targeting performed by a user on the basis of the electronic targeting aid.

In the case of such automatic targeting via the camera image, automatic precise targeting of the target (for which a pattern or a template is optionally electronically stored) can be performed via image analyses of the recorded camera image (i.e., matching of the template with the target recorded in the image) and automatic motorized alignment of the targeting unit can be caused such that the targeting image position (i.e., for example, the center point of the electronic crosshair) comes to rest on the relevant target center point (i.e., for example, on a defined target center point of the template located in the matched state).

The measurement data which can then be captured during such automatic targeting can (although a display of an image and a marking for the targeting image position on a display screen is not absolutely necessary for this purpose) then be added to the measurement data set as measurement data stored for targeting using the electronic marking as a targeting aid.

Furthermore, the invention also relates to a method to be carried out using a surveying device for checking and/or recalibrating a targeting image position, which is given by calibration parameters and for which a marking can be displayed as a targeting aid on a display screen of the surveying device together with an image which can be displayed by a camera of the surveying device, wherein the targeting image position makes reference to a targeting direction defined by a physical targeting marking of the surveying device, and wherein the surveying device is equipped with a base, a support, which is pivotable in relation to the base about a first axis, a targeting unit, which is pivotable in relation to the support about a second axis, having telescope optics defining an optical beam path having an objective, the physical targeting marking which defines the targeting direction, in particular a reticle, an ocular, and the camera for recording an image through the objective, goniometers for measuring pivot positions of the support and the targeting unit, and the display screen for displaying a recorded image together with a marking, in particular for displaying the image with superimposed electronic crosshair, the crosshair center point of which falls on the targeting image position.

The method according to the invention is characterized in this case by a sequence of at least one pass of targeting of a target using the physical targeting marking, capturing first measurement data comprising a first pivot position of the support and the targeting unit, which is measured by the goniometers, and/or a first image recorded by the camera and adding these first measurement data to a measurement data set, targeting of the identical target using the marking for the targeting image position as a targeting aid, capturing second measurement data, which conform in type to the first measurement data, comprising a second pivot position of the support and the targeting unit, which is measured by the goniometers, and/or a second image recorded by the camera and adding these second measurement data to the measurement data set, and in that correlated analysis of the measurement data set is performed automatically on the part of the surveying device, on the basis of which the targeting image position is checked with respect to correspondence to the targeting direction defined by the physical targeting marking and/or recalibrated by updating the calibration parameters.

The special aspects, embodiments, and refinements mentioned in the scope of the above-described surveying device can also be applied similarly in this case to this method.

Furthermore, the invention also relates to a computer program product having program code, which is stored on a machine-readable carrier and contains stored items of information about a targeting image position, which is given by calibration parameters and for which a marking can be displayed as a targeting aid on a display screen of a surveying device together with an image displayable by a camera of the surveying device, wherein the targeting position makes reference to a targeting direction of the surveying device defined by a physical targeting marking, and a sequence of targeting actions of an identical target successively at least one time using the physical targeting marking and at least one time using the marking for the targeting image position as a targeting aid.

The computer program product according to the invention having program code is configured in this case to automatically control or carry out the following steps when the program is executed on the control and analysis unit of the above-described surveying device according to the invention:

in response to a first trigger, which can be given in the event of completed targeting of the target using the physical targeting marking, capturing first measurement data comprising a first pivot position of the support and the targeting unit, which is measured via the goniometers, and/or a first image recorded by the camera and adding these first measurement data to a measurement data set, in response to a second trigger, which can be given in the event of completed targeting of the target using the marking for the targeting image position as a targeting aid, capturing second measurement data, which conform in type to the first measurement data, comprising a second pivot position of the support and the targeting unit, which is measured by the goniometers, and/or a second image recorded by the camera and adding the second measurement data to the measurement data set, checking and/or recalibrating, which is performed by updating the stored calibration parameters, of the targeting image position with respect to correspondence with the targeting direction defined by the physical targeting marking on the basis of a correlated analysis of the measurement data set.

The special aspects, embodiments, and refinements mentioned in the scope of the above-described surveying device can also be applied similarly in this case to this computer program product.

BRIEF DESCRIPTION OF THE DRAWINGS

The method according to the invention and the device according to the invention will be described in greater detail solely as examples hereafter on the basis of specific exemplary embodiments which are schematically illustrated in the drawings, wherein further advantages of the invention will also be described. In the specific figures:

FIG. 13 shows an example of a display of a marking for the targeting image position.

DETAILED DESCRIPTION

Figure 1:
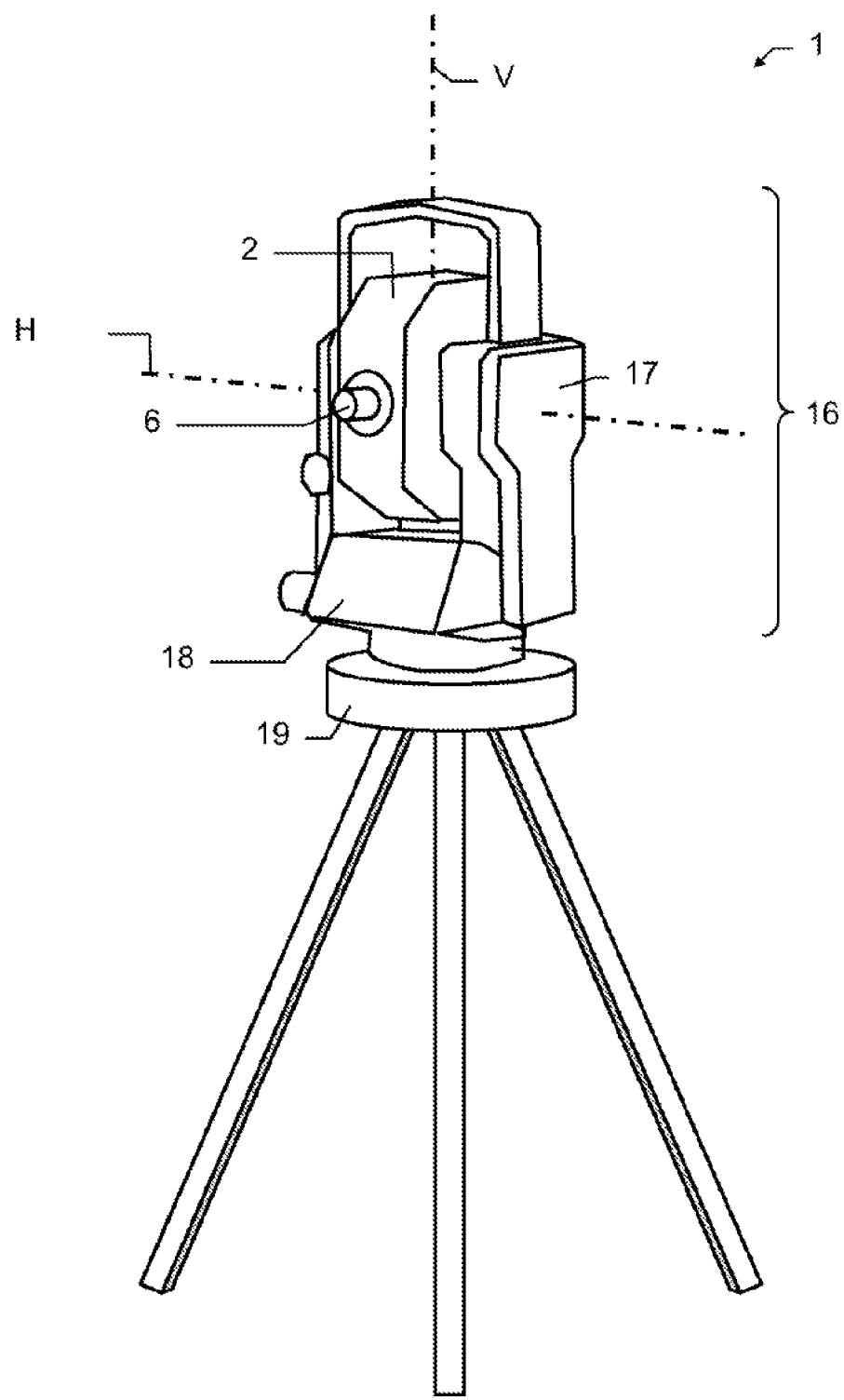
FIGS. 1 & 5 each show a geodetic surveying device according to the invention, designed as a total station.
Figure 5:
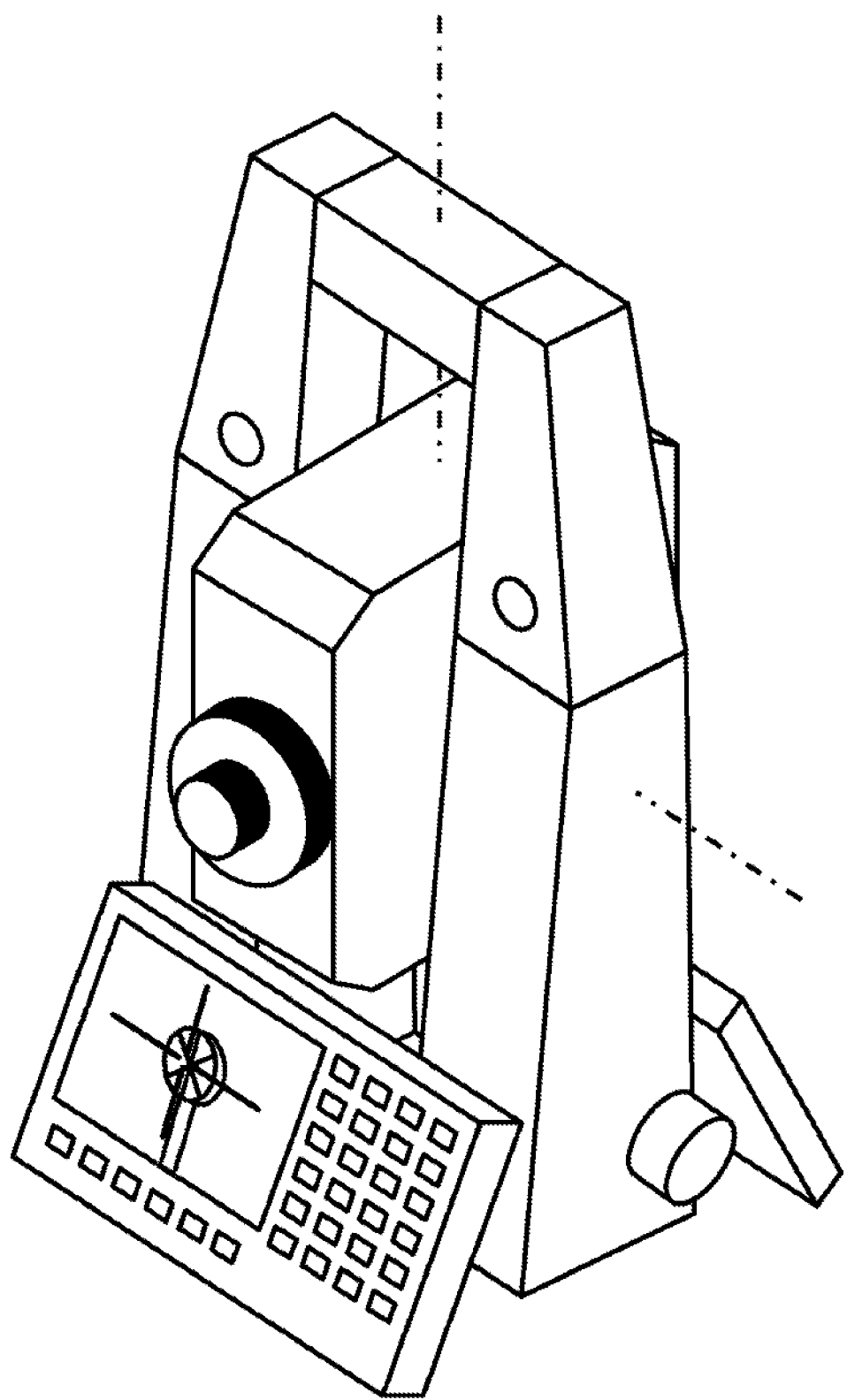

FIGS. 1 and 5 show a geodetic surveying device 1 according to the invention, which is designed as a total station, for measuring horizontal angles, vertical angles (which correspond to pivot positions of the support and the targeting unit), and distances to a remote target which is aimed at.

The total station can—as shown in FIG. 1—be arranged on a tripod, wherein a base 19 of the total station is directly and fixedly connected to the tripod. The main body of the total station, which is also referred to as the upper part 16, is rotatable in relation to the base 19 about a vertical standing axis V.

The upper part 16 has in this case a support 17—formed by two columns, for example—an aiming unit 2, which is mounted so it is rotatable between the columns about the horizontal tilt axis H, and an electronic data processing and display module 18, which is formed by a control and analysis unit and a display screen. The electronic data processing and display module 18 can be designed in a known manner for controlling the surveying device 1 and for processing, displaying, and storing measurement data.

The targeting unit or aiming unit 2 is arranged on the support 17 so it is rotatable about a horizontal tilt axis H and can therefore be pivoted or tilted horizontally and vertically in relation to the base 19 for alignment on a target object. In this case, the aiming unit is embodied as a shared aiming unit module, wherein at least one objective, focusing optics, a coaxial camera sensor, an optical targeting graticule, and the ocular 6 are arranged in or on a shared aiming unit housing.

By means of the aiming unit 2, a target object can be targeted and the distance from the total station to the target object can be captured in an electro-sensory manner. Furthermore, means for electro-sensory capturing of the angle alignment of the upper part 16 in relation to the base 19 and the aiming unit 2 in relation to the support 17 are provided. These measurement data, which are captured in an electro-sensory manner, are supplied to the control and analysis unit and processed thereby, so that the position of the target point in relation to the total station can be ascertained, graphically displayed, and stored by data processing and display module 18.

Figure 2:
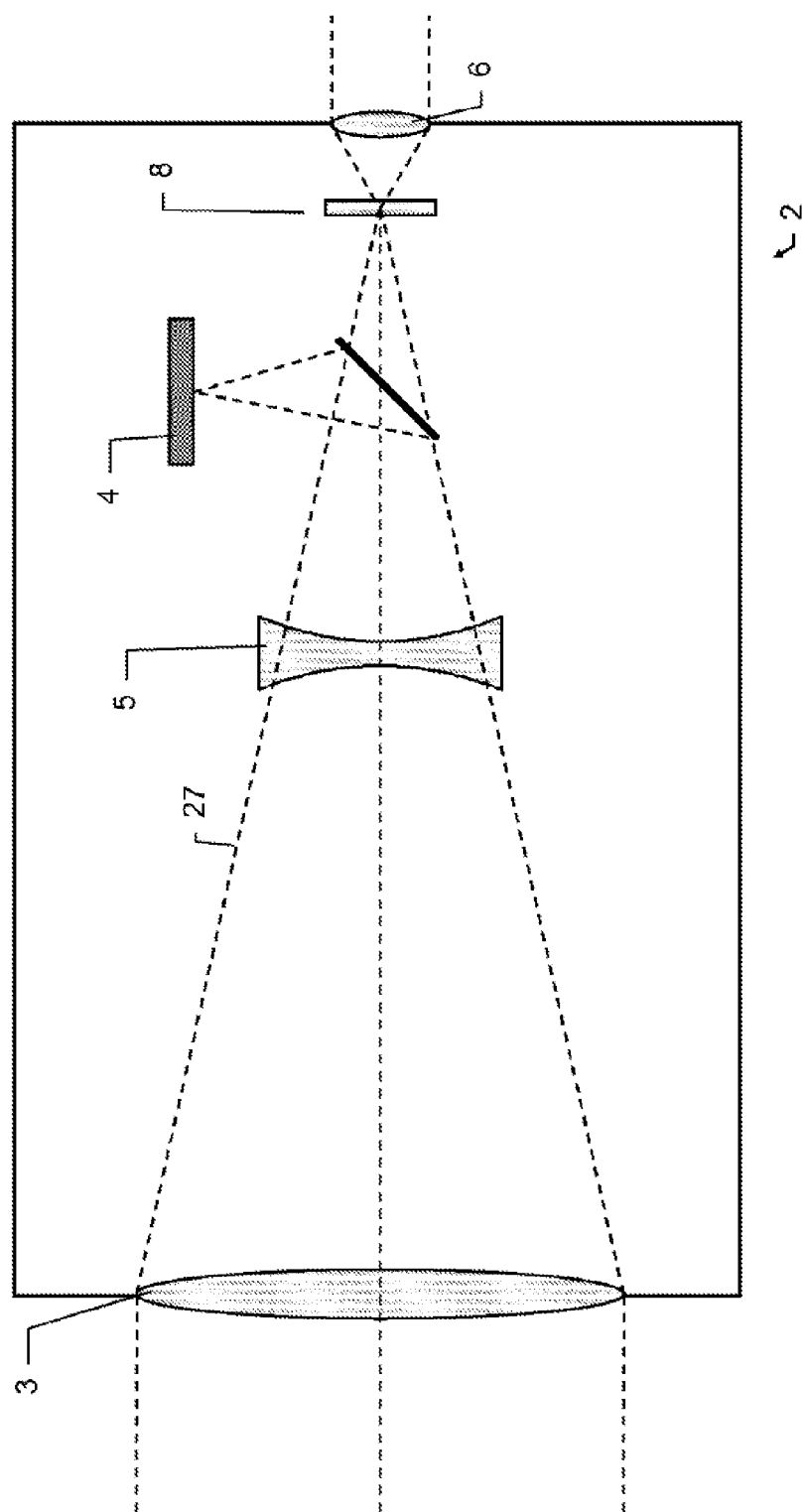
FIGS. 2-4 show possible embodiments of the targeting unit having telescope optics of a surveying device.
Figure 3:
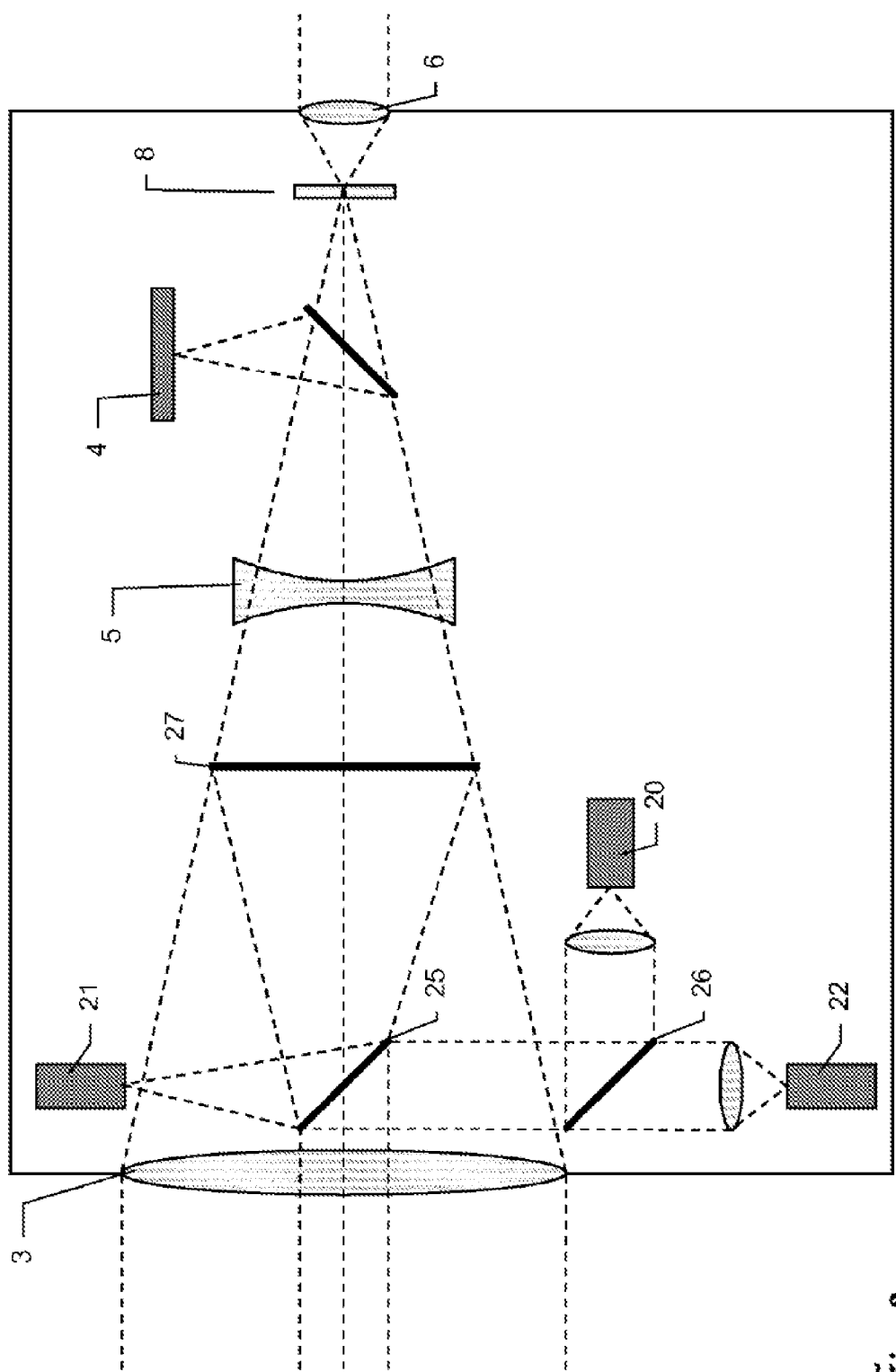
Figure 4:
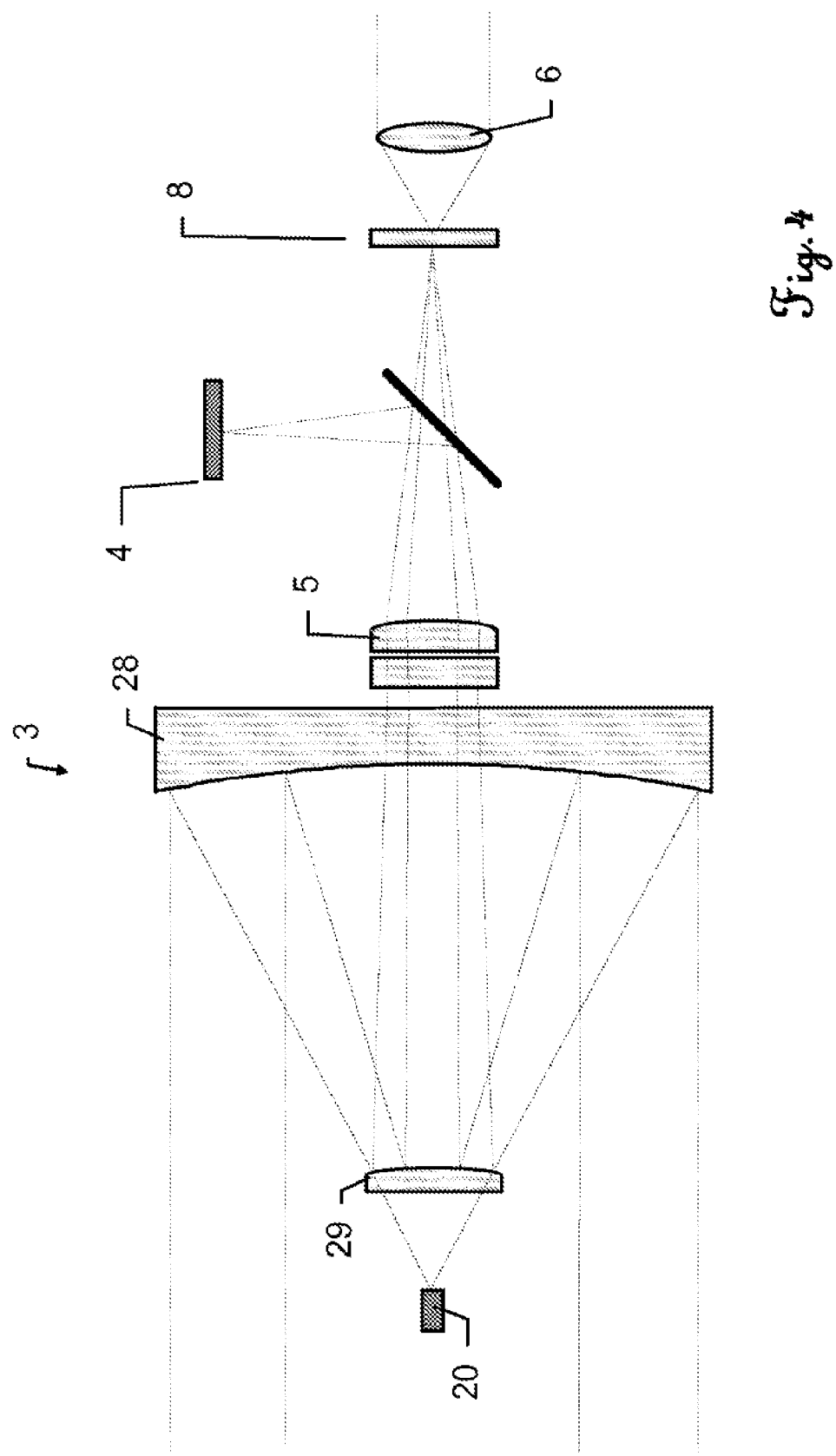

FIGS. 2, 3, and 4 schematically show possible embodiments of the targeting unit having telescope optics, as are also already well known in the prior art.

FIG. 2 shows in this case a simplified form of the embodiment which is shown in FIG. 3. FIG. 3 shows in this case a refractive embodiment of aiming unit optics according to the invention.

The aiming unit optics comprise the objective 3, the focusing optics 5, a camera sensor 4—aligned coaxially to the optical axis of the aiming unit 2—for capturing a camera image, a crosshair graticule 8, and an ocular 6.

The camera sensor 4 is connected in this case to an electronics graphic processor for generating a display image from the captured camera image. The graphic processor is in turn connected to the display screen, so that the generated display image can be displayed on the basis of the display screen. The objective 3 can also, for example, be constructed with multiple lenses or can be embodied as panfocal—having variable depth of field.

For the distance measurement and the automatic target search function, an EDM laser source 20 or a fine targeting light source 22 are provided, wherein the EDM laser beams or the fine targeting beams are coupled and decoupled appropriately on the basis of a first and second beam combiner 25, 26—for example, beam splitter surfaces having dichroic coating.

The EDM laser source 20 can, for example, emit EDM laser beams in the visual range—for example, having a wavelength of 630 nm—so that a measurement spot is visible on the target object.

Beam decoupler 27 can be provided in this case between the first beam combiner 25 and the focusing optics 5, which decouples the EDM laser beams, but in contrast advantageously transmits the visual spectrum in as unobstructed a manner as possible. The decoupled EDM laser beams are guided by the beam combiner 25 onto an EDM receiver 21.

The focusing element 5, which is variable in its position, can alternatively also be designed with multiple lenses. The focusing element 5 advantageously has a stable, precisely reproducible position for objects in the infinite, so that the best possible achievable accuracy can be ensured in the automatic fine targeting.

FIG. 4 shows a further embodiment of an aiming unit optic according to the invention. In this case, the aiming unit is embodied as a catadioptric system having mirror optics. A first, concave mirror 28 is used in this case as the objective 3.

A second, smaller mirror 29 is designed as transmissive for EDM laser beams, so that the EDM laser beams emitted on the basis of the EDM laser source 20 are transmitted through the second mirror 29 for the distance measurement.

On the basis of the multilens focusing optics 5, an image of the field of vision range is focused on the camera sensor 4 and captured as a camera image. In addition, an intermediate image is also generated in the plane of the graticule 8, which can be observed by a user through the ocular 6.

Figure 6:
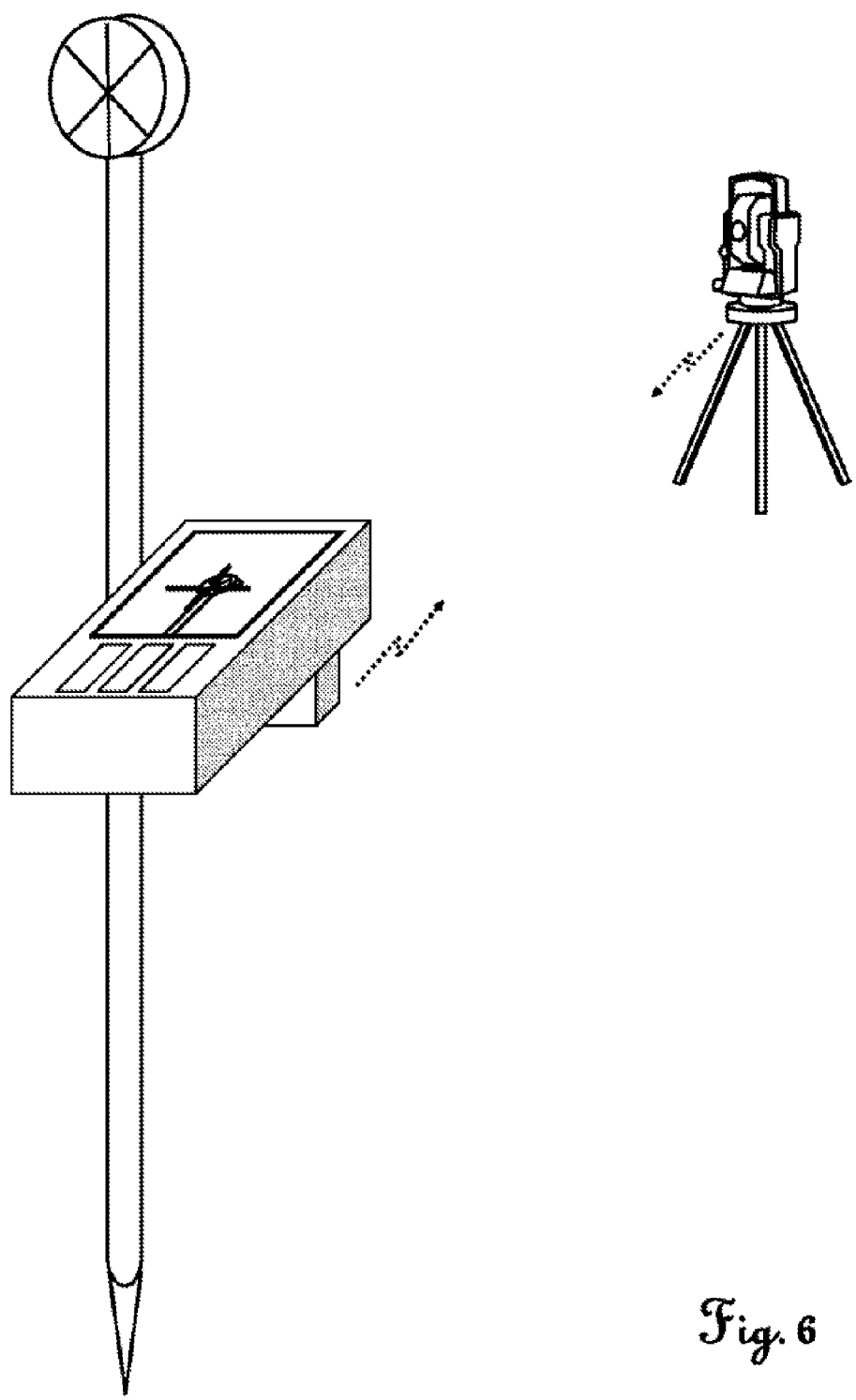
FIG. 6 shows a geodetic surveying device having base station and peripheral remote control unit.
Figure 7:
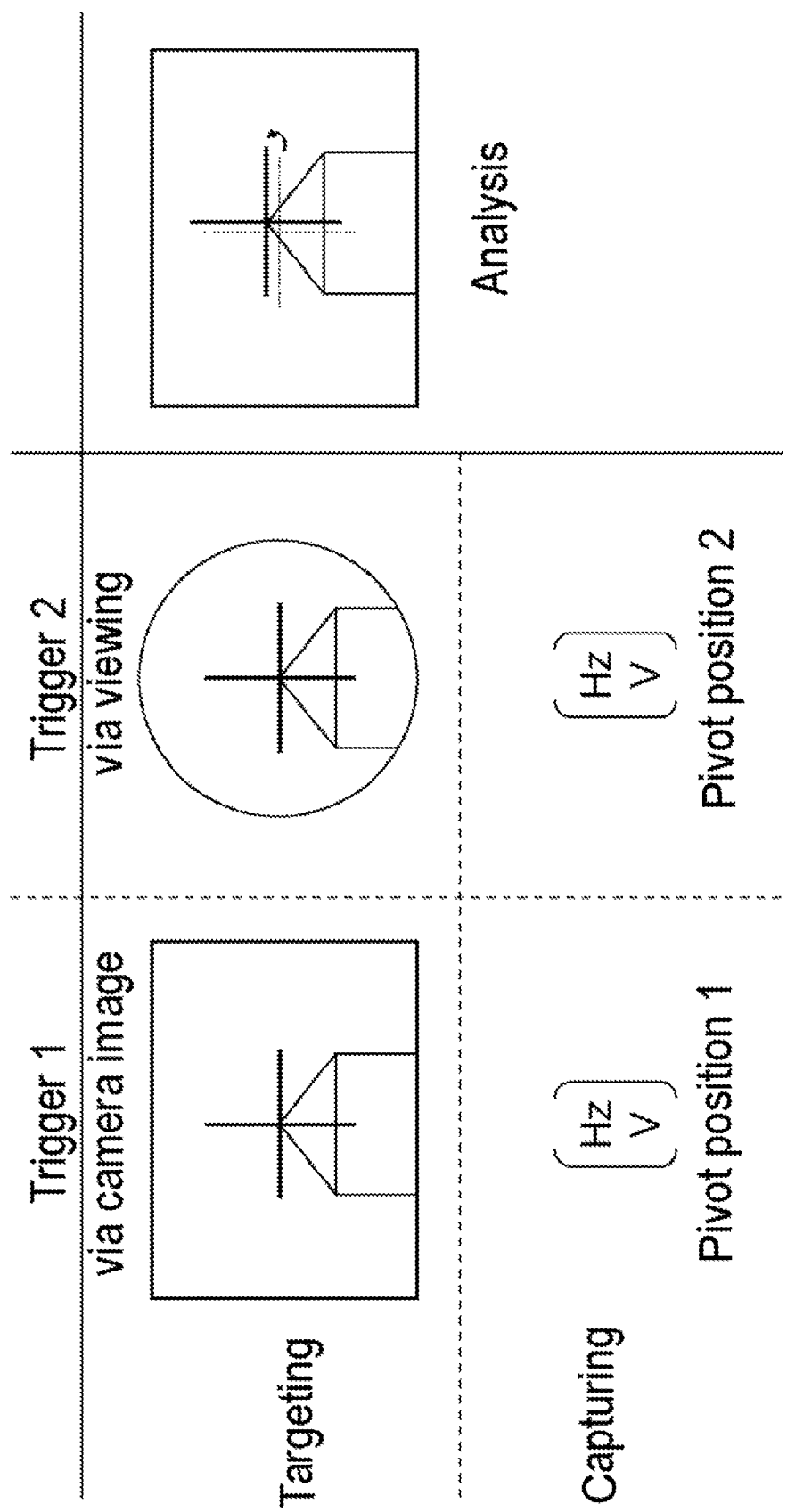
FIGS. 7-11 & 14 show visualizations of possible procedures and sequences in the scope of the function according to the invention.
Figure 8:
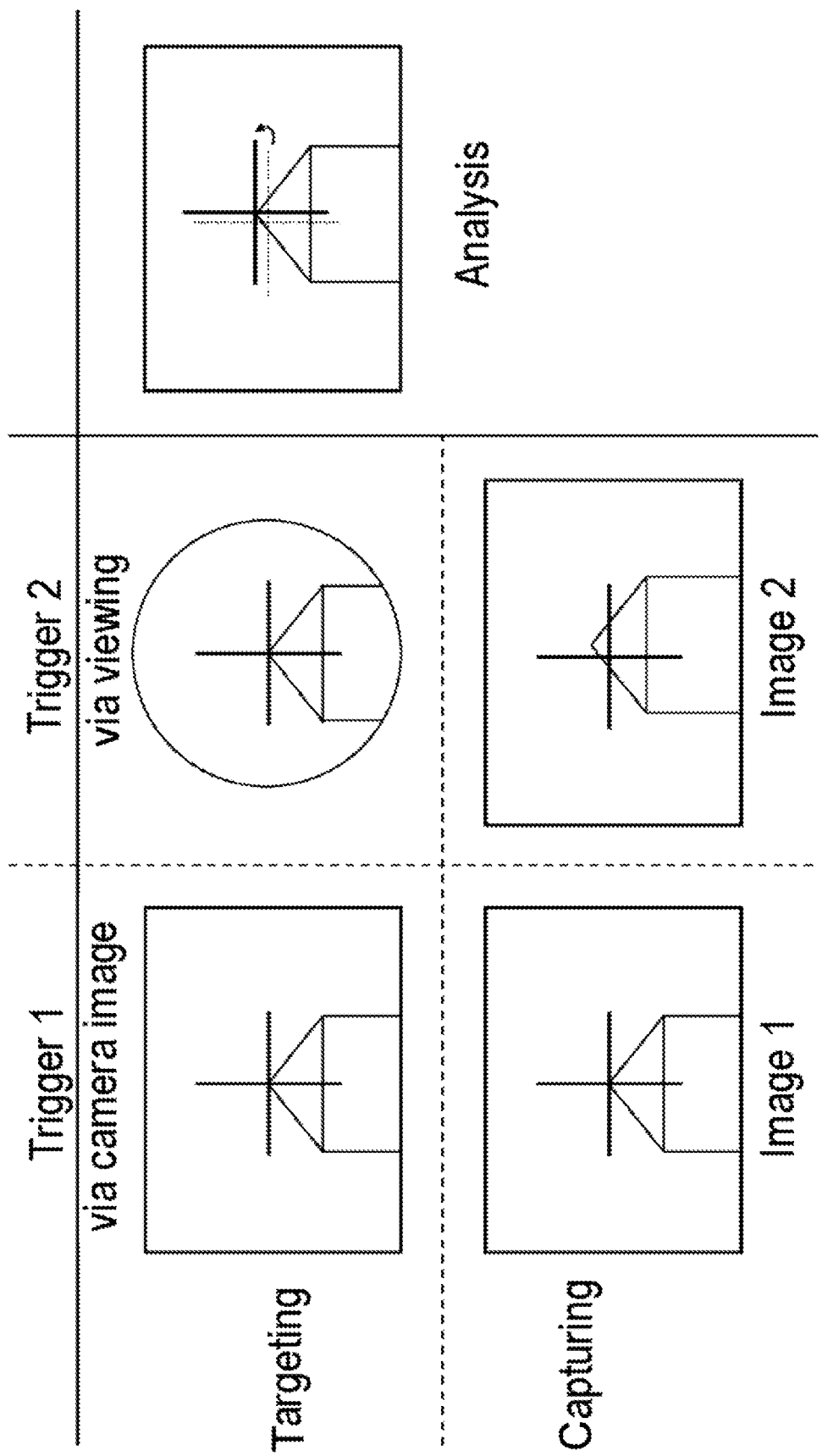

FIG. 6 shows a peripheral remote control unit, which is physically independent from the base station (also shown in the background), having a separate additional display screen and a separate additional analysis and control unit.

FIGS. 7 to 11 and 14 explain possible procedures and sequences in the scope of the function according to the invention.

Figure 10:
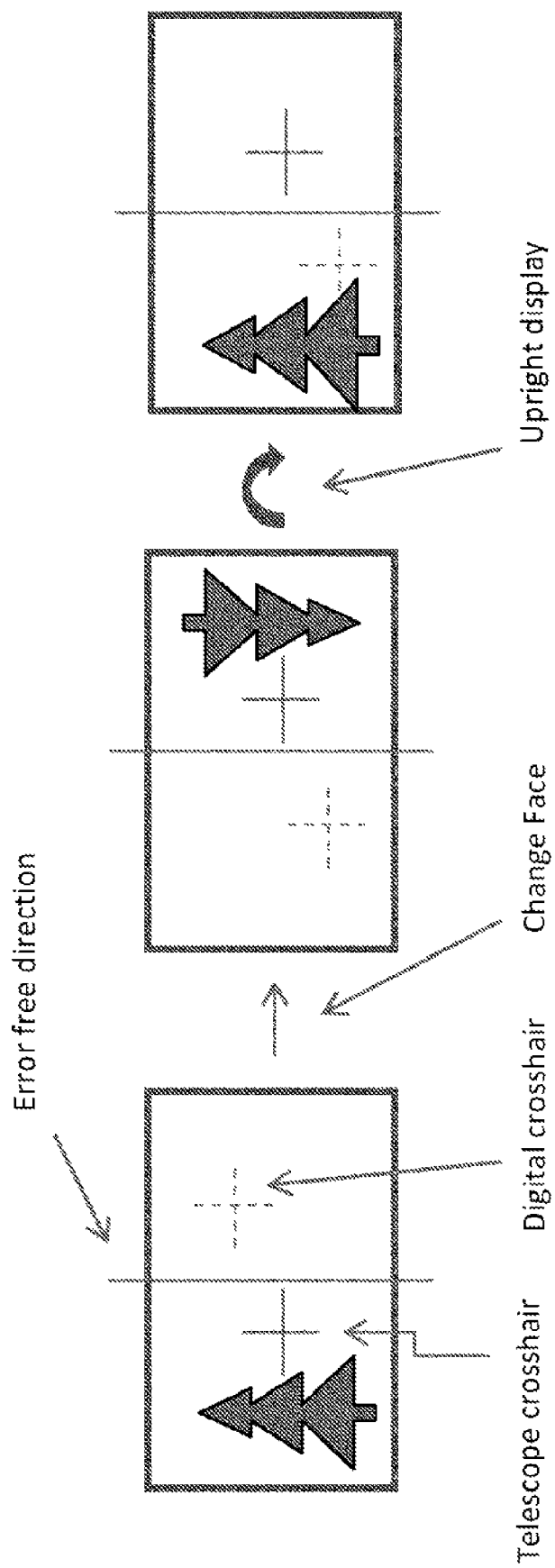

In FIG. 10, the inscriptions integrated in the figure mean the following in this case:

"Digital crosshair": indicated direction through the digital crosshair

"Error-free direction": error-free targeting direction

"Telescope crosshair": indicated targeting direction through the reticle as the physical targeting marking in the telescope optics "Change face": changeover of the targeting unit, i.e., change/changeover of the location (face) of the targeting unit "Upright display": alignment of the image in the display screen (image reversal)

Figure 11:
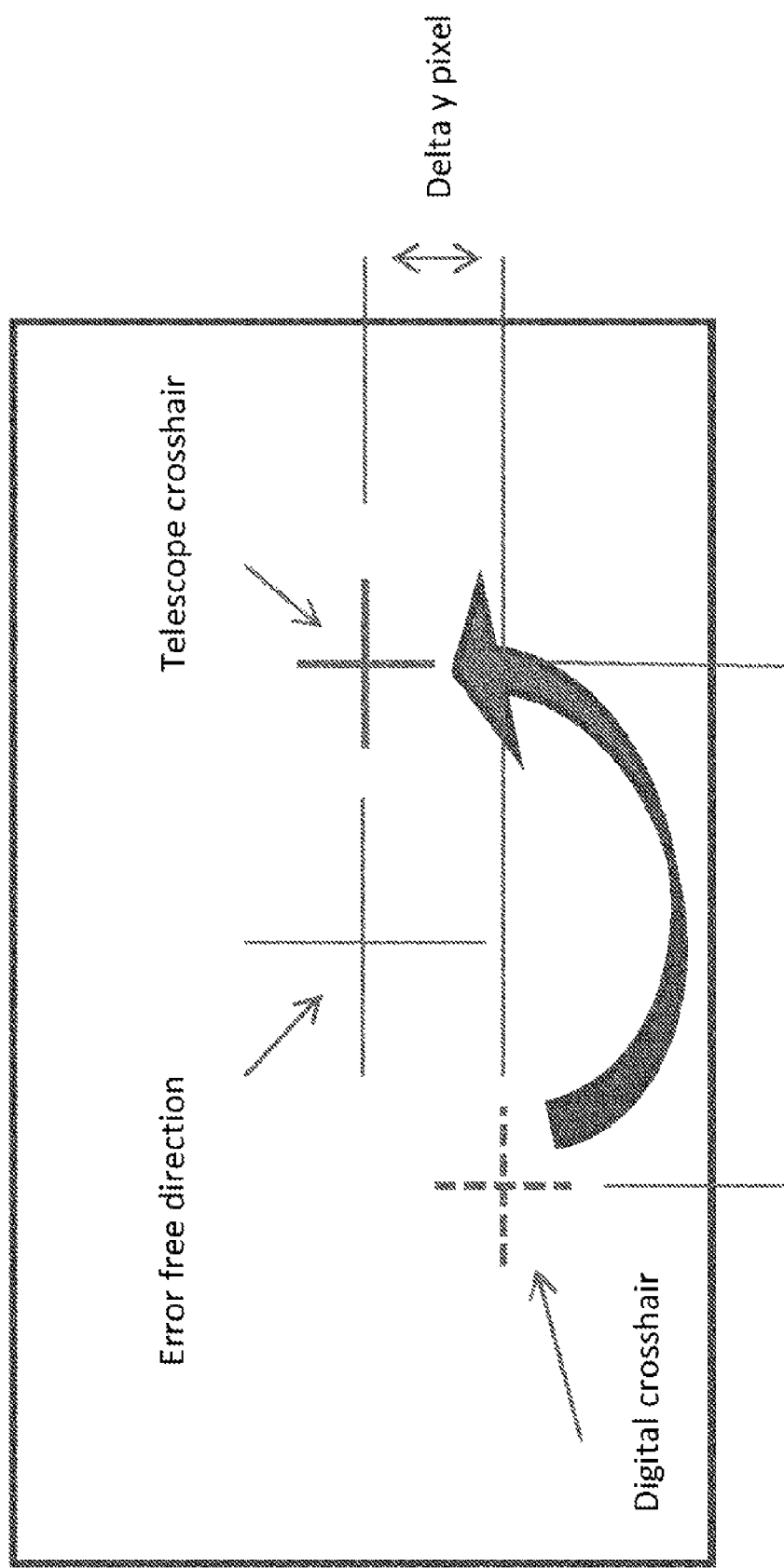

In FIG. 11, the inscriptions integrated in the figure mean the following in this case:

"Digital crosshair": indicated direction through the digital crosshair

"Error-free direction": error-free targeting direction

Figure 14:
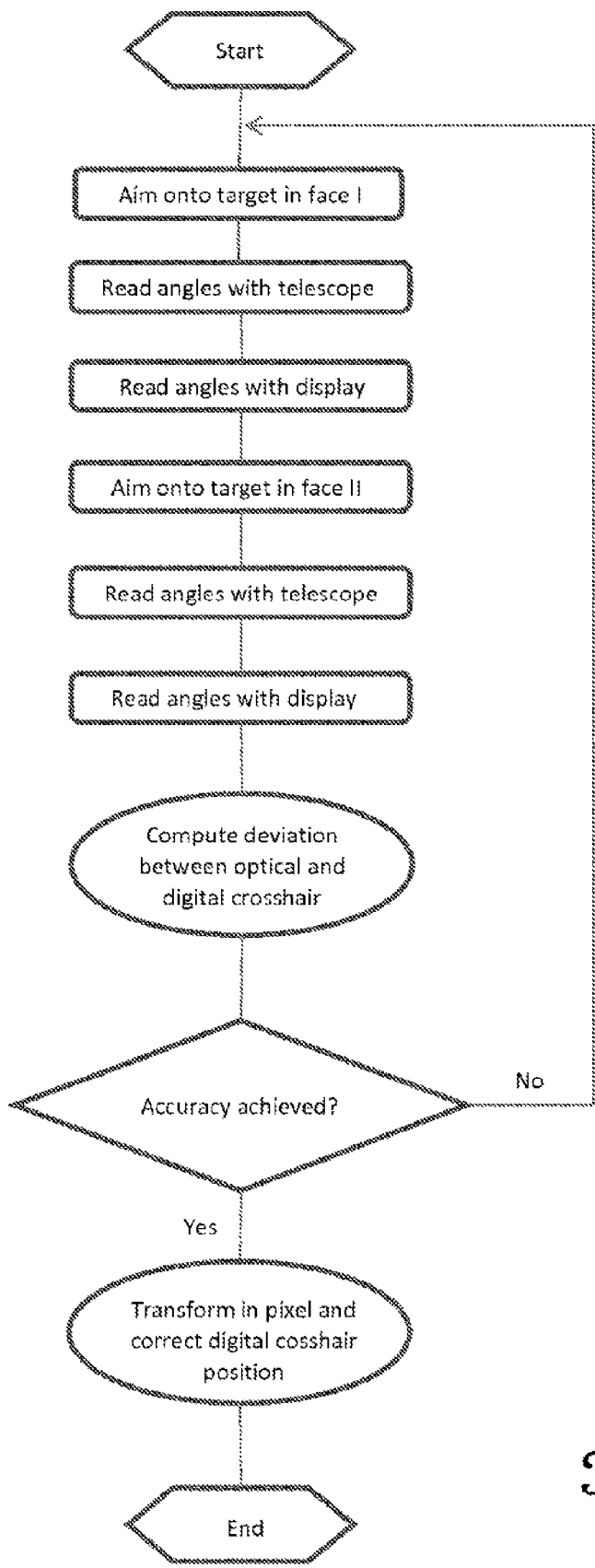

"Telescope crosshair": indicated targeting direction through the reticle as the physical targeting marking in the telescope optics "Delta x pixel": pixel difference in the x direction "Delta y pixel": pixel difference in the y direction In FIG. 14, the inscriptions integrated in the figure mean the following in this case:

"Aim onto target in face I":
Targeting of the target in location 1 of the targeting unit (face I).

"Read angles with telescope":
Reading out the angles (pivot position of the targeting unit) with targeting using the viewing path of the telescope (targeting unit), i.e., the physical targeting marking.

"Read angles with display":
Reading out the angles (pivot position of the targeting unit) with targeting using the display screen (targeting unit), i.e., the artificial marking displayed in the image for the targeting image position.

"Aim onto target in face II":
Targeting of the target in location 2 of the targeting unit (face II), i.e., after changeover of the targeting unit.

"Read angles with telescope":
Reading out the angles (pivot position of the targeting unit) with targeting using the viewing path of the telescope (targeting unit), i.e., the physical targeting marking.

"Read angles with display":
Reading out the angles (pivot position of the targeting unit) with targeting using the display screen (targeting unit), i.e., the artificial marking displayed in the image for the targeting image position.

"Compute deviation between optical and digital crosshair":
Calculating the difference (the deviation) between the optical (physical) and the digital (artificial, electronic) crosshair (i.e., targeting marking), i.e., thus a difference between the results from the targeting actions and measurements in each case using the physical targeting marking, on the one hand, and the artificial marking for the targeting image position, on the other hand.

"Accuracy achieved?":
Desired accuracy achieved/given? (I.e., step of checking whether the direction indicated on the basis of the artificial marking corresponds sufficiently precisely with the direction which is indicated by the physical targeting marking).

"Transform in pixel and correct digital crosshair position":
Transforming the calculated difference into pixels (i.e., a pixel offset) and accordingly correcting the position of the electronic crosshair.

Figure 9:
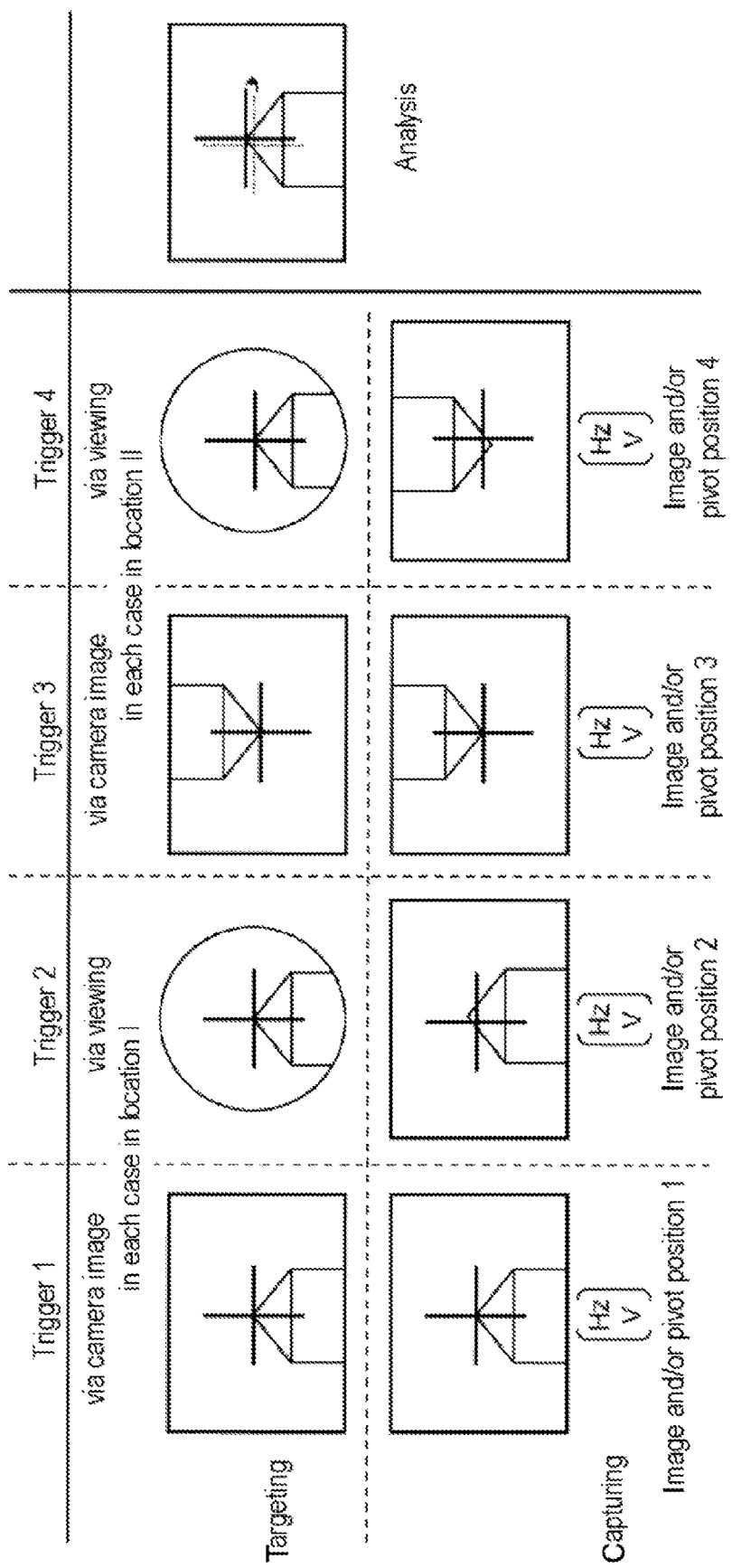

As is apparent in FIG. 9, the camera image having superimposed electronic crosshair, which is displayed on the display screen for targeting the target in the changed second location (i.e., in the changed state of the targeting unit, i.e., in face II), can also be displayed automatically flipped on the part of the software on the display screen to increase the operating convenience for the user.

Figure 12:
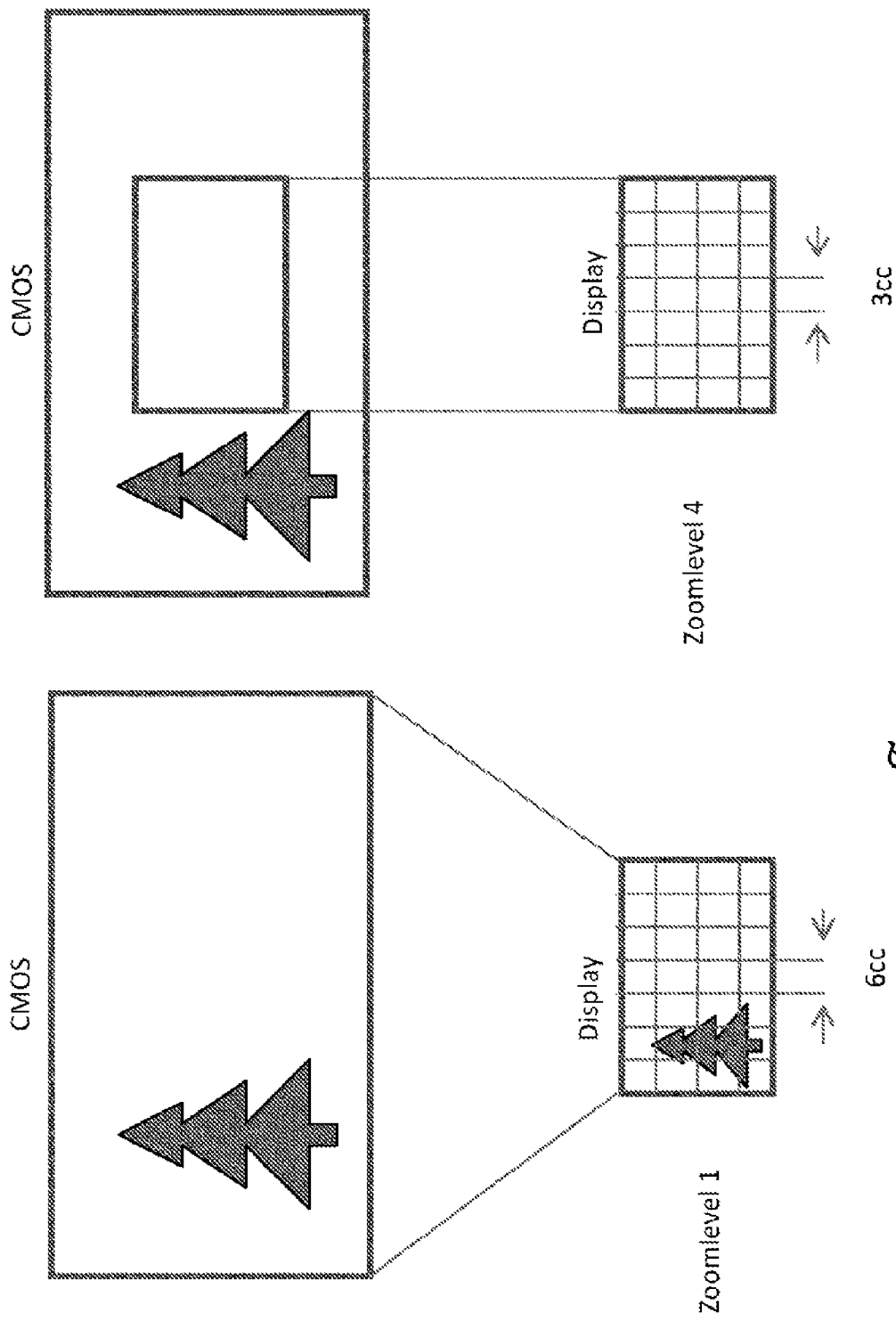
FIG. 12 shows an illustration of a possibility for digital zooming in the image displayed on the display screen.

FIG. 12 illustrates a possibility for digital zooming in the image displayed on the display screen and Figure illustrates the display of the marking for the targeting image position in a grayscale and/or color level representation such that the image position is indicated with sub-display pixel resolution as it appears to the user.

It is obvious that these illustrated figures only schematically illustrate possible exemplary embodiments. The various approaches can also be combined with one another and with methods of the prior art.

What is claimed is:
1. A surveying device, comprising:
a base;
a support, which is pivotable in relation to the base about a first axis;
a targeting unit, which is pivotable in relation to the support about a second axis, having telescope optics defining an optical beam path having
an objective,
a physical targeting marking defining a targeting direction,
an ocular, and
a camera for recording an image through the objective;
goniometers for measuring pivot positions of the support and the targeting unit;
an analysis and control unit, which contains stored calibration parameters with respect to an image position indicating the targeting direction in the recorded image as the targeting image position; and a display screen for displaying a recorded image with marking for the targeting image position, wherein a partially automatic function for checking and/or recalibrating the targeting image position, wherein a sequence is defined for the function and corresponding items of sequence information are stored for this purpose in the analysis and control unit, during which sequence targeting actions of an identical target are successively performed at least once using the physical targeting marking and at least once using the marking for the targeting image position as a targeting aid, and wherein in the scope of the function, in a manner automatically controlled or carried out by the analysis and control unit:

in response to a first trigger, which can be given in the event of completed targeting of the target using the physical targeting marking, first measurement data comprising a first pivot position of the support and the targeting unit, which is measured via the goniometers, and/or a first image recorded by the camera, are captured and added to a measurement data set, in response to a second trigger, which can be given in the event of completed targeting of the target using the marking for the targeting image position as a targeting aid, second measurement data, which conform in type to the first measurement data, comprising a second pivot position of the support and the targeting unit, which is measured by the goniometers, and/or a second image recorded by the camera, are captured and added to the measurement data set, the targeting image position is automatically checked, on the basis of a correlated analysis of the measurement data set, with respect to correspondence with the targeting direction defined by the physical targeting marking, and/or recalibrated by updating the stored calibration parameters.

2. The surveying device as claimed in claim 1, wherein the surveying device comprises a video theodolite or a video tachymeter.

3. The surveying device as claimed in claim 1, wherein the physical targeting marking comprises a crosshair.

4. The surveying device as claimed in claim 1, wherein the display screen is for displaying the image with superimposed electronic crosshair, the crosshair center point of which falls on the targeting image position.

5. The surveying device as claimed in claim 1, wherein the sequence is defined so that multiple passes of the targeting actions are carried out, and in each case in the scope of the function, in a manner automatically controlled by the analysis and control unit in response to a further trigger, which can be given in the event of targeting of the target, which is performed by a user, using the physical targeting marking or using the marking for the targeting image position as a targeting aid, further measurement data comprising a further pivot position of the support and the targeting unit, which is measured by the goniometers, and/or a further image recorded by the camera are automatically captured and added to the measurement data set.

6. The surveying device according to claim 1, wherein the sequence is defined so that the targeting actions are repeated in a changed state of the targeting unit, and in the scope of the function, in a manner automatically controlled by the analysis and control unit in response to a third trigger, which can be given by a user in the case of targeting of the target, which is performed in the changed state of the targeting unit, using the physical targeting marking, third measurement data comprising a third pivot position, which is measured by the goniometers, of the support and the targeting unit and/or a third image recorded by the camera are automatically captured and added to the measurement data set, in response to a fourth trigger, which can be given by a user in the case of targeting of the target, which is performed in the changed state of the targeting unit, using the marking for the targeting image position as a targeting aid, fourth measurement data, which conform in type to the third measurement data, comprising a fourth pivot position of the support and the targeting unit, which is measured by the goniometers, and/or a fourth image recorded by the camera are automatically captured and added to the measurement data set.

7. The surveying device according to claim 1, wherein, the first and second measurement data comprise at least one first and one second pivot position, in the scope of the function, in the case of the correlated analysis of the measurement data set, a difference between the first and the second pivot positions is translated into an image position offset—with application of stored parameters with respect to the camera geometry and the optical projection properties thereof—by which the targeting image position deviates from a new setpoint targeting image position, and this image position offset is optionally applied to the targeting image position, so that the stored calibration parameters are updated such that they reflect the new setpoint targeting image position as the targeting image position.

8. The surveying device according to claim 1, wherein the first and second measurement data comprise at least one first and one second image, in the scope of the function, in the case of the correlated analysis of the measurement data set on the basis of image recognition and using the second image, an identification of the target in the first image is performed and an image position of the identified target in the first image is determined as the target image position and on the basis of a comparison of this target image position to the targeting image position, the targeting image position is checked and/or recalibrated by updating the stored calibration parameters, wherein the stored calibration parameters are updated such that they newly reflect the ascertained target image position as the targeting image position.

9. The surveying device according to claim 1, wherein the measurement data set contains redundant measurement data, wherein a redundancy with respect to the checking and/or recalibration in the scope of the function is automatically used by the analysis and control unit for:

averaging, so that the accuracy can be increased for the checking and/or recalibration, ascertaining a degree of determination or degree of quality of the checking and/or recalibration, and/or concurrent checking and/or recalibration of at least one of the following further calibration parameters:

a parameter with respect to a direction error as a deviation of the targeting direction defined by the physical targeting marking from an actual measurement axis, a parameter with respect to an error of the goniometers, a parameter with respect to a camera geometry of the camera, a parameter with respect to a projection property of the camera, or a parameter with respect to an error of the optical axis of the camera.

10. The surveying device according to claim 1, wherein the sequence is defined so that multiple passes of the targeting actions are carried out, wherein in the scope of the function, the correlated analysis of the measurement data set, which is carried out automatically by the analysis and control unit, is carried out as an intermediate analysis after carrying out one defined pass of the multiple passes of the targeting actions and a degree of determination and/or a degree of quality with respect to a redetermination of the targeting image position is ascertained for the measurement data collected up to the respective intermediate analysis, and wherein the analysis and control unit derives an item of information on the basis of this degree of determination as to whether further passes of targeting actions are to be carried out or whether the function is to be ended, wherein this item of information is output as an action recommendation to the user by means of provided output means.

11. The surveying device according to claim 1, wherein output means for outputting indicators are provided, wherein the display screen displays the output means for the visual output, these output means being automatically activated by the analysis and control unit in the scope of the function such that a user is guided on the basis of the output indicators through the sequence of targeting actions, wherein an indicator is displayed to prompt the user to respectively carry out one of the targeting actions either using the physical targeting marking or using the marking for the targeting image position as a targeting aid, wherein it is additionally indicated in each case whether the respective targeting action is to be carried out in the changed state of the targeting unit or not, an indicator is displayed as a statement that a respective automatic capture of measurement data in response to a respective trigger has been successfully completed, after completion of a respective automatic capture of measurement data in response to a respective trigger, an indicator is displayed as a statement, that and which next targeting action is to be carried out in the scope of the defined sequence, and/or after completion of a respective automatic capture of measurement data in response to a respective trigger, an indicator is displayed as a statement that all targeting actions of the sequence are completed.

12. The surveying device according to claim 11, wherein the statement includes a supplementary statement as to whether the measurement data set collected on the basis of the performed targeting actions makes the image position able to be sufficiently profoundly checked or makes the image position able to be updated with sufficient accuracy and determination.

13. The surveying device according to claim 1, further comprising a temperature sensor;

wherein the stored calibration parameters contain a temperature-dependent function for the targeting image position, so that the marking which can be displayed on the display screen for the targeting image position can be set in accordance with a current temperature, and in the scope of the function, in a manner automatically controlled by the analysis and control unit, a temperature is captured by the temperature sensor and this temperature is taken into consideration for the checking or recalibration.

14. The surveying device according to claim 1, wherein:

a camera pixel resolution is defined by the camera and the image which can be recorded has a defined image pixel resolution; and in the scope of the function, in a manner automatically controlled by the analysis and control unit, the targeting image position is checked with sub-pixel resolution and/or recalibrated by updating the stored calibration parameters.

15. The surveying device according to claim 1, wherein:

a display pixel resolution is defined by the display screen; and the marking for the targeting image position is displayed in a grayscale and/or color level representation such that the image position is indicated with sub-display pixel resolution as seen by the user.

16. The surveying device according to claim 1, further comprising a coaxial laser distance meter is integrated in the targeting unit.

17. The surveying device according to claim 1, further comprising a base station, which comprises at least the base, the support, the targeting unit, and the goniometers, wherein the surveying device also comprises, in addition to the base station, a physically independent peripheral remote control unit, which has a data connection to the base station, wherein the display screen and the analysis and control unit are provided either in the peripheral remote control unit or in the base station or—usable as needed—in the peripheral remote control unit and the base station.

18. The surveying device according to claim 1, wherein the base station comprises the analysis and control unit and the display screen.

19. A method to be carried out using a surveying device for checking and/or recalibrating a targeting image position, which is given by calibration parameters and for which a marking can be displayed as a targeting aid on a display screen of the surveying device together with an image which can be displayed by a camera of the surveying device, wherein the targeting image position makes reference to a targeting direction defined by a physical targeting marking of the surveying device, and wherein the surveying device comprises:
 a base,
 a support, which is pivotable in relation to the base about a first axis,
 a targeting unit, which is pivotable in relation to the support about a second axis, having telescope optics defining an optical beam path having
 an objective,
 a physical targeting marking defining a targeting direction,
 an ocular, and
 a camera for recording an image through the objective,
 goniometers for measuring pivot positions of the support and the targeting unit, and
 a display screen for displaying a recorded image together with the marking, wherein the method comprises:
 targeting a target using the physical targeting marking;
 capturing first measurement data comprising a first pivot position of the support and the targeting unit, which is measured by the goniometers, and/or a first image recorded by the camera and adding these first measurement data to a measurement data set;
targeting the identical target using the marking for the targeting image position as a targeting aid;
capturing second measurement data, which conform in type to the first measurement data, comprising a second pivot position of the support and the targeting unit, which is measured by the goniometers, and/or a second image recorded by the camera and adding the second measurement data to the measurement data set,
performing a correlated analysis of the measurement data set, which is performed automatically on the part of the surveying device, wherein the targeting image position is checked with respect to correspondence to the targeting direction defined by the physical targeting marking and/or recalibrated by updating the calibration parameters.

20. A computer program product having program code, which is stored on a non-transitory machine-readable carrier and contains stored items of information about
a targeting image position, which is given by calibration parameters and for which a marking can be displayed as a targeting aid on a display screen of a surveying device together with an image which can be displayed by a camera of the surveying device, wherein the targeting image position makes reference to a targeting direction of the surveying device defined by a physical targeting marking, and
a sequence of targeting actions of an identical target successively at least once using the physical targeting marking and at least once using the marking for the targeting image position as a targeting aid,
for when the program is executed on the control and analysis unit of the surveying device the surveying device controls or carries out the following steps:
in response to a first trigger, which can be given in the event of completed targeting of the target using the physical targeting marking, capturing first measurement data comprising a first pivot position of the support and the targeting unit, which is measured via the goniometers, and/or a first image recorded by the camera and adding of these first measurement data to a measurement data set
in response to a second trigger, which can be given in the event of completed targeting of the target using the marking for the targeting image position as a targeting aid, capturing second measurement data, which conform in type to the first measurement data, comprising a second pivot position of the support and the targeting unit, which is measured by the goniometers, and/or a second image recorded by the camera and adding the second measurement data to the measurement data set, and
checking and/or recalibrating, which is performed by updating the stored calibration parameters, of the targeting image position with respect to correspondence with the targeting direction defined by the physical targeting marking on the basis of a correlated analysis of the measurement data set.

* * * * *